United States Patent [19]

Matsuda

[11] Patent Number: 5,717,202

[45] Date of Patent: Feb. 10, 1998

[54] METHOD AND APPARATUS FOR MEASURING MOTION AMOUNT OF A LABORATORY ANIMAL

[75] Inventor: Hideo Matsuda, Toyama-ken, Japan

[73] Assignee: Toyo Sangyo Co., Ltd., Toyama-Ken, Japan

[21] Appl. No.: 593,417

[22] Filed: Jan. 29, 1996

Related U.S. Application Data

[63] Continuation-in-part of Ser. No. 363,316, Dec. 23, 1994, abandoned.

[30] Foreign Application Priority Data

Dec. 27, 1993  [JP]  Japan .................. 5-349768

[51] Int. Cl.$^6$ ............................................ G01V 9/04
[52] U.S. Cl. ..................................... 250/221; 119/421
[58] Field of Search ............................ 250/221, 559.4; 119/15, 17, 416, 421; 340/555–557, 573, 574; 356/375

[56] References Cited

U.S. PATENT DOCUMENTS

| | | |
|---|---|---|
| 3,304,911 | 2/1967 | Hakata et al. ............... 119/15 |
| 3,478,220 | 11/1969 | Milroy ....................... 250/221 |
| 3,805,061 | 4/1974 | De Missimy et al. ........... 250/221 |
| 4,267,443 | 5/1981 | Carroll et al. ............... 250/221 |
| 4,337,726 | 7/1982 | Czekajewski et al. ........... 119/15 |
| 4,384,201 | 5/1983 | Carroll et al. ............... 250/221 |
| 4,574,734 | 3/1986 | Mandalaywala et al. .......... 119/15 |
| 4,968,974 | 11/1990 | Sakano ........................ 119/15 |
| 4,998,014 | 3/1991 | Hasegawa ..................... 250/221 |
| 5,608,209 | 3/1997 | Matsuda ...................... 250/221 |

*Primary Examiner*—Stephone Allen
*Attorney, Agent, or Firm*—Sughrue, Mion, Zinn, Macpeak & Seas, PLLC

[57] ABSTRACT

A system for measuring the motion amount of laboratory animals includes a main body having a single central processing unit installed, a single frame set to surround an animal in a bounded area, optical sensor light-emitting elements and optical sensor light-receiving elements disposed on opposite sides of the frame. The optical sensor light-emitting elements sequentially emit optical beams such that the light-emitting elements do not simultaneously emit optical beams, the optical beams being received by corresponding light-receiving elements when the emitted optical beams are not obstructed so as to detect the location and movements of the laboratory animal.

10 Claims, 9 Drawing Sheets

METHOD AND APPARATUS FOR MEASURING MOTION AMOUNT OF A LABORATORY ANIMAL

RELATED APPLICATION

The present application is a continuation-in-part application of U.S. application Ser. No. 08/363,316 filed Dec. 23, 1994, now abandoned, the subject matter of which is incorporated herein by reference.

FIELD OF THE INVENTION

The present invention relates to a method and apparatus for measuring the motion amount of a laboratory animal by detection using optical sensors.

BACKGROUND OF THE INVENTION

Conventionally, a method for detecting a change in dielectric constant caused by a motion of an animal using an LC resonance circuit is adopted in order to measure the motion amount of a laboratory animal.

Also, a method of measuring the motion amount using optical sensors is adopted. However, the conventional methods and apparatuses suffer the following problems.

In the method of detecting a change in dielectric constant caused by a motion of an animal using an LC resonance circuit, when measurements are performed by a plurality of measuring apparatuses, it is actually difficult to maintain each measuring apparatus to the same sensitivity, and the detected dielectric constant is often influenced by the individual difference or movement speed of a laboratory animal. For this reason, even in a single apparatus, the measurement results vary.

When a motion amount is measured using optical sensors, it is difficult to dispose optical sensors at high density because of interferences of light among the optical sensors, and hence, small motions are hardly measured.

Further, in order to eliminate interferences of light among the sensors, light-emitting elements with high focusing characteristics and light-receiving elements with high sensitivity must be used, resulting in an expensive apparatus.

SUMMARY OF THE INVENTION

It is an object of the present invention to provide an inexpensive apparatus and a measuring method thereof for measuring the motion amount of a laboratory animal which are free from a sensitivity difference among apparatuses when measurements are made using a plurality of apparatuses, and which can conduct repetitive measurements with high precision.

An apparatus according to the present invention comprises a main body having a central processing unit (referred to as a CPU hereinafter) installed inside, a frame set to surround a laboratory animal in a cage or the like, and optical sensor light-emitting elements and optical sensor light-receiving elements disposed on a surface of the frame so as to correspondingly oppose each other. The optical sensors are controlled by the CPU in the main body. The CPU in the main body also executes correcting and processing input signals detected by the sensors. The light-emitting elements and light-receiving elements are respectively arranged in a staggered pattern. Each light-emitting element adopts a near infrared LED, and each light-receiving element adopts a phototransistor.

The plurality of pairs of light-emitting elements and light-receiving elements are arranged at a high density to have an interval of 5 mm or less between neighboring elements. The light-emitting elements are sequentially electrically scanned to emit optical beams and the emitted optical beams are detected by the corresponding light-receiving elements.

In a method according to the present invention, when detecting the position of a laboratory animal on the horizontal surface using the optical sensors, a length corresponding to an interval between two neighboring optical sensors is added to each of two sides of a respective maximum length and maximum width of an area corresponding to the size of the animal which is detected by optical sensors so as to determine the laboratory animal as a rectangular area. The motion amount is measured as numerical data indicating the lengthwise and bredthwise movements of the rectangular area on the horizontal surface.

BRIEF DESCRIPTION OF THE DRAWINGS

FIGS. 5(a) and 5(b) are still other explanatory views of the motion amount measurement process for laboratory animals according to a method in an embodiment of the present invention, in which

FIGS. 6(a) and 6(b) are still other explanatory views of the motion amount measurement process for laboratory animals according to a method in an embodiment of the present invention, in which

DETAILED DESCRIPTION OF THE INVENTION

A motion amount measuring apparatus for laboratory animals according to the present invention comprises a main body having a CPU installed inside, a frame set to surround a laboratory animal in a cage or the like, and optical sensor light-emitting elements and optical sensor light-receiving elements disposed on a surface of the frame so as to correspondingly oppose each other. In the present invention, the frame preferably has a rectangular shape and optical sensor light-emitting elements are arranged on one surface of each of two pairs of opposing surfaces of the frame and optical sensor light-receiving elements are arranged on the other surfaces so as to correspondingly oppose each other.

Since both the light-emitting elements and the light-receiving elements are fixed to the frame, the optical sensors can be easily handled in the unit of the frame to which the sensors are integrated. The optical sensors can be detached as needed and the optical sensors in the attached state do not particularly require any adjustment. The CPU in the main body controls the electrical scanning of the optical sensors, and corrects and processes input signals detected by the sensors. An output port is provided in the CPU so that the processed data can be transmitted to a micro computer in order to correct or analyze the measurement data if necessary.

When the light-emitting elements and the light-receiving elements are arranged in a staggered pattern, respectively, the tail of an animal is not detected continuously by the optical sensors. This results in the motion of the tail not being measured because the tail is not perceived as an object having a certain area and only the head, trunk, and legs of the animal serve as objects to be measured, and the motion amount measurement can be performed with high accuracy.

A plurality of pairs of light-emitting elements and light-receiving elements are arranged at a high density and there is an interval of 5 mm or less between neighboring elements. The light-emitting elements are sequentially electrically scanned to emit optical beams, and emitted optical beams are received by the corresponding light-receiving elements. Since the light-emitting elements do not emit optical beams simultaneously, interferences of light caused by emission of light from a plurality of optical sensors can be prevented enabling the optical sensors to be arranged at high density. As one optical sensor emits optical beam at a time, the number of amplifiers can be decreased, thereby the manufacturing cost of the apparatus can be reduced.

Interferences of light among optical sensors need not be considered as the light-emitting elements are sequentially electrically scanned to emit optical beams. Therefore, the focusing characteristics and the light-receiving sensitivity of the optical sensors become less important. Thus, versatile components such as near infrared LEDs and phototransistors can be applied as optical sensors so that an inexpensive apparatus can be provided. Use of the near infrared LEDs and phototransistor is also advantageous as they do not stimulate a laboratory animal.

Due to the high density arrangement of the optical sensors, a small action of a laboratory animal, e.g., actions of forelegs of a rat can be detected.

In a motion amount measuring method for laboratory animals according to the present invention, when detecting the position of the animal on the horizontal surface using the optical sensors, a length corresponding to an interval between two neighboring optical sensors is added to each of two sides of a maximum length and a maximum width of an area corresponding to the size of a laboratory animal which is detected by optical sensors, thus perceiving the size of the animal as a rectangular area. The motion amount δ of a laboratory animal in the horizontal direction is measured as numerical data calculated by an equation $\delta=\sqrt{(X^2+Y^2)}$ where X and Y indicate the lengthwise and bredthwise movements of the rectangular area on the horizontal surface detected by the optical sensors.

Upon detection of the laboratory animal as a rectangular area, a MOVE1 mask having a relatively small area and a MOVE2 mask having a relatively large area are prescribed to measure the motion amount of the laboratory animal. The MOVE1 mask sequentially detects small motions of the animal and the MOVE2 mask, large motions of the animal, thus compensating for reliability of measurement. MOVE2 mask is prescribed by adding certain lengths to a size of MOVE1 mask. The added lengths are determined according to an object of a measurement by employing a unit length which is defined from an interval between two neighboring optical sensors.

Since the laboratory animal is detected as a rectangular area, minute actions of the animal's body such as breathing, shakes, and the like and the slight light-shielded states caused by the animal's hair can be ignored, and high-accuracy measurement can be realized.

EXAMPLE

Figure 1:
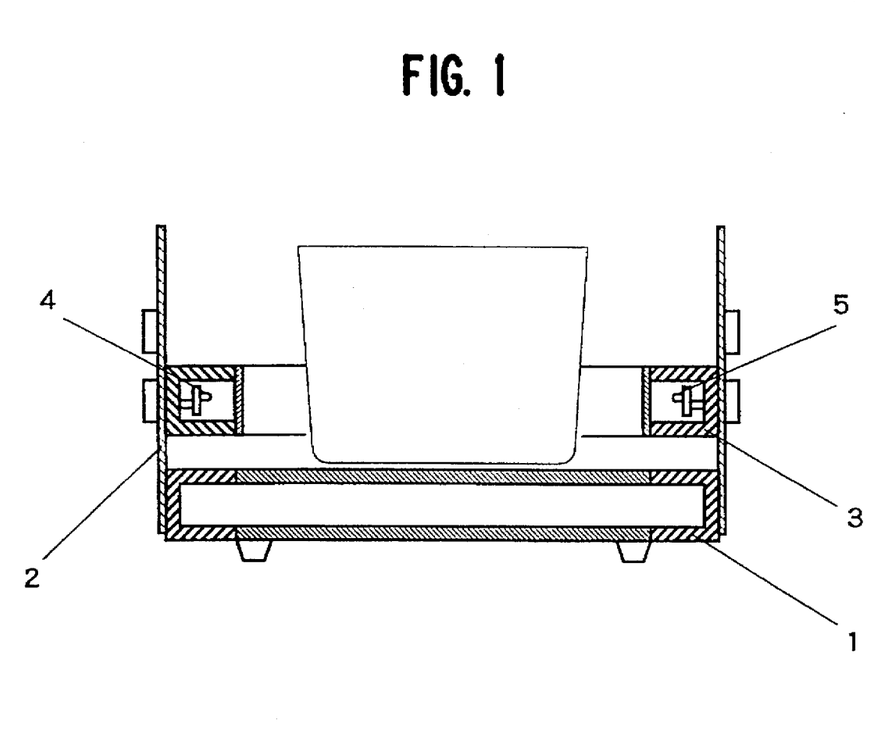
FIG. 1 is a sectional view of a motion amount measuring apparatus for laboratory animals according to an embodiment of the present invention.
Figure 2:
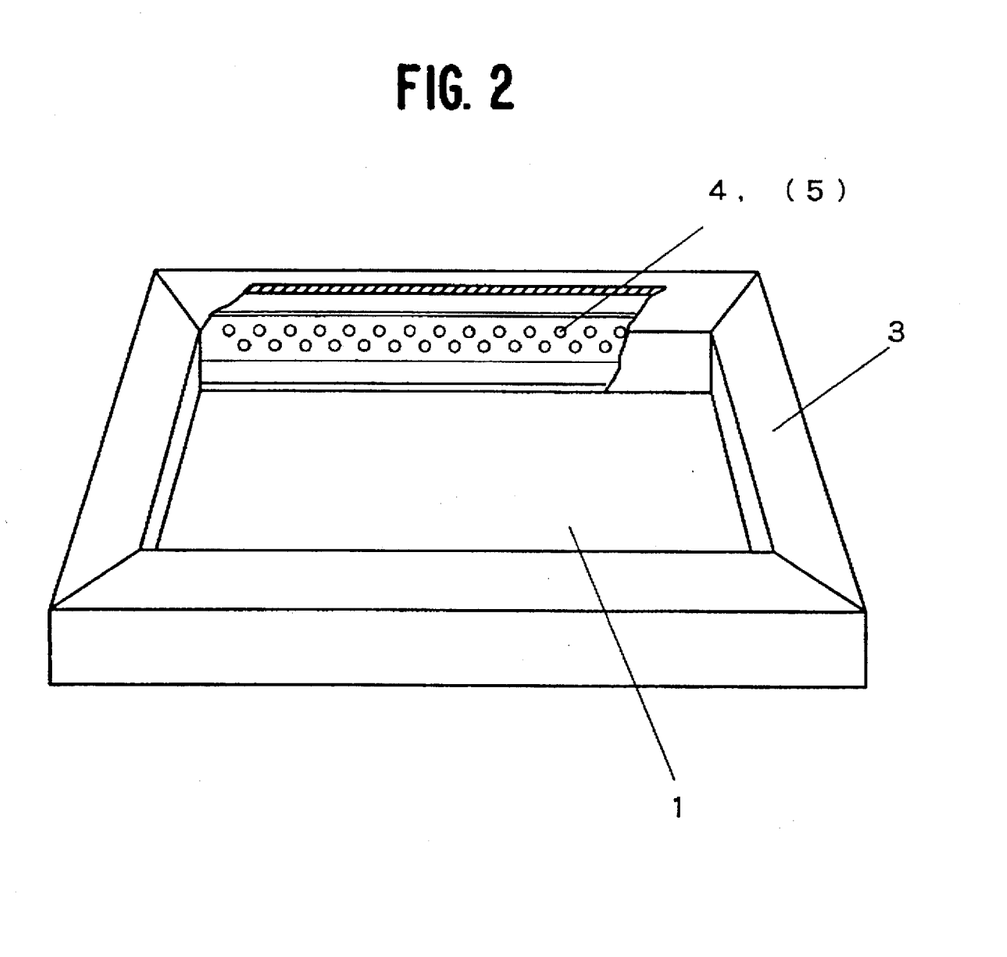
FIG. 2 is a perspective view of the apparatus shown in FIG. 1.

FIG. 1 is a sectional view of a motion amount measurement apparatus for laboratory animals according to an embodiment of the present invention, and FIG. 2 is a perspective view of the apparatus.

As shown in FIGS. 1 and 2, a frame 3 is fixed to a main body 1 having a rectangular planar shape via side walls 2. In the main body 1, a CPU is installed (not shown) to control the electrical scanning of the optical sensors, and to correct and process input signals detected by the optical sensors. A plurality of optical sensor light-emitting elements 4 using near infrared LEDs are attached to one surface of each of two pairs of opposing surfaces of the frame 3, and a plurality of optical sensor light-receiving elements 5 using phototransistors are attached to positions opposing the optical sensor light-emitting elements 4 on the other surfaces.

Figure 7:
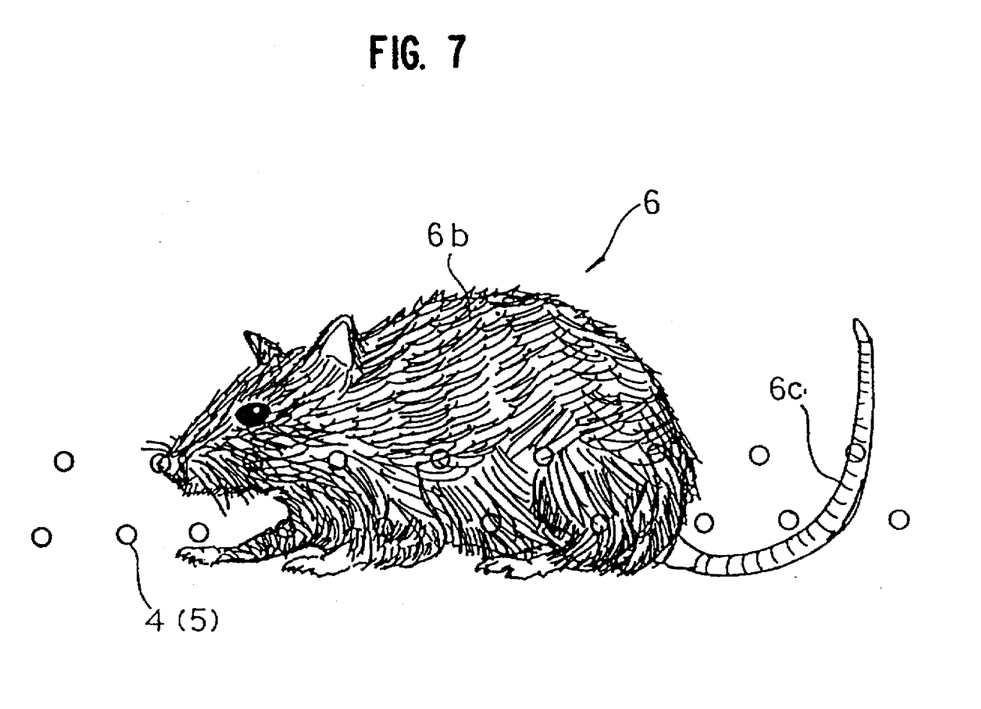
FIG. 7 is a partially enlarged side view of an apparatus according to an embodiment of the present invention.

As shown in FIG. 2, the light-emitting elements 4 and the light-receiving elements 5 are respectively arranged in a staggered pattern while keeping an interval of 5 mm between neighboring elements. With this arrangement, as shown in FIG. 7, a tail 6c of an animal 6 is not continuously detected by the optical sensors 4 and 5, and the tail 6c does not serve as a target for motion amount measurement. For this reason, only the head, trunk and legs of the animal 6 serves as actual targets for motion amount measurement, and measurement can be performed with high accuracy.

The light-emitting elements 4 are sequentially electrically scanned to emit optical beams, thereby preventing interferences of light among the optical sensors. This enables the optical sensors to be arranged at height density allowing high-accuracy measurement.

Figure 3:
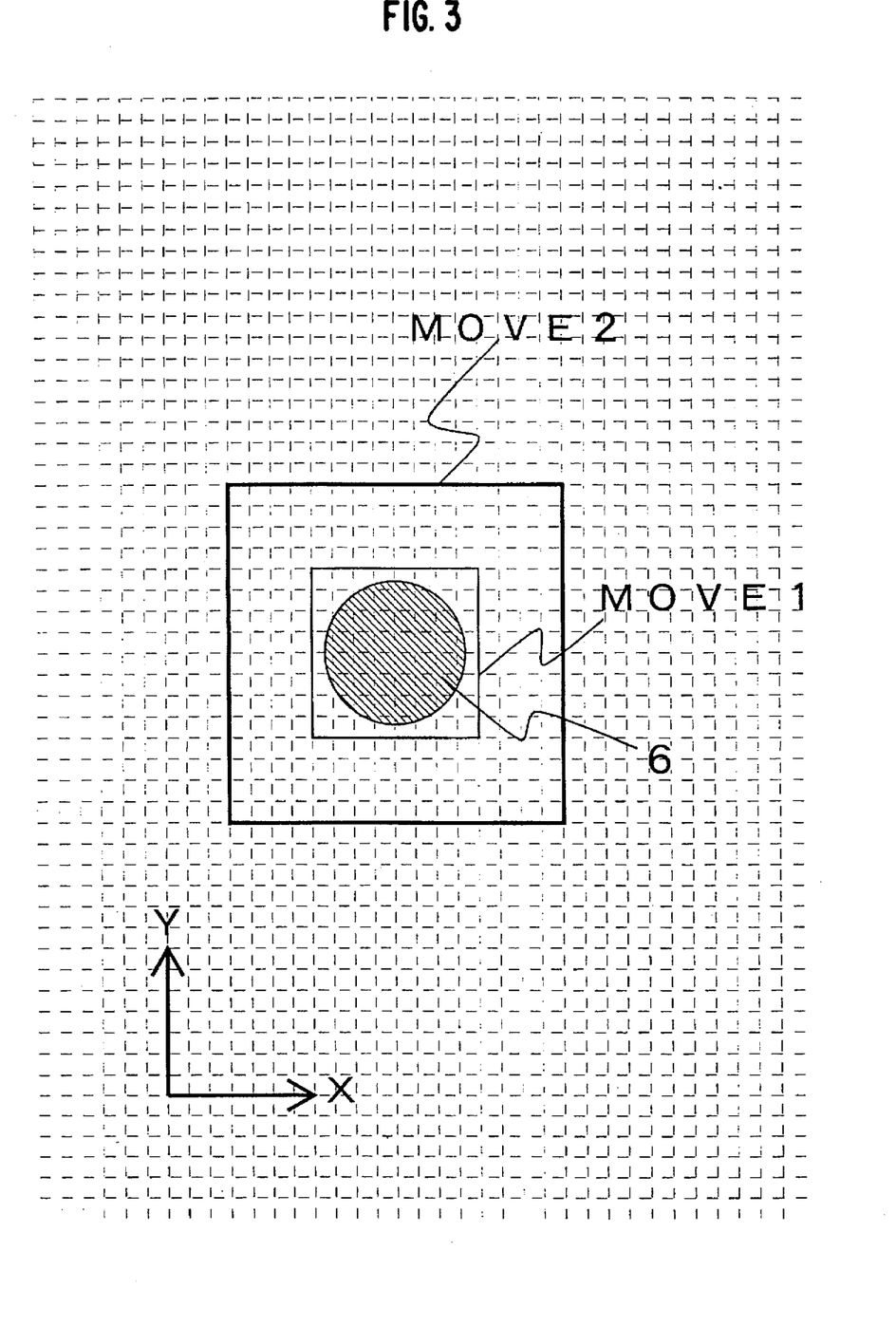
FIG. 3 is an explanatory view of a motion amount measurement process for laboratory animals according to a method in an embodiment of the present invention.

FIGS. 3 to 6 are explanatory views when detecting the position of a laboratory animal on the horizontal surface by the optical sensors. In each of FIGS. 3 to 6, dotted lines represent optical beams emitted from the light-emitting elements 4 and received by the corresponding light-receiving elements 5. A circle 6 represents an area of an animal detected by the optical sensors. In the measurement, as shown in FIG. 3, the current position of an animal on the horizontal surface is detected by the optical sensors, and a length corresponding to an interval between two neighboring optical sensors is added to respective two sides of each of a maximum length and a maximum width of the detected area 6 of the animal, thereby recognizing the animal as a rectangular area, i.e., a MOVE1 mask. Furthermore, another rectangular area larger than the rectangular area of the MOVE1 mask is recognized as a MOVE2 mask.

Figure 4:
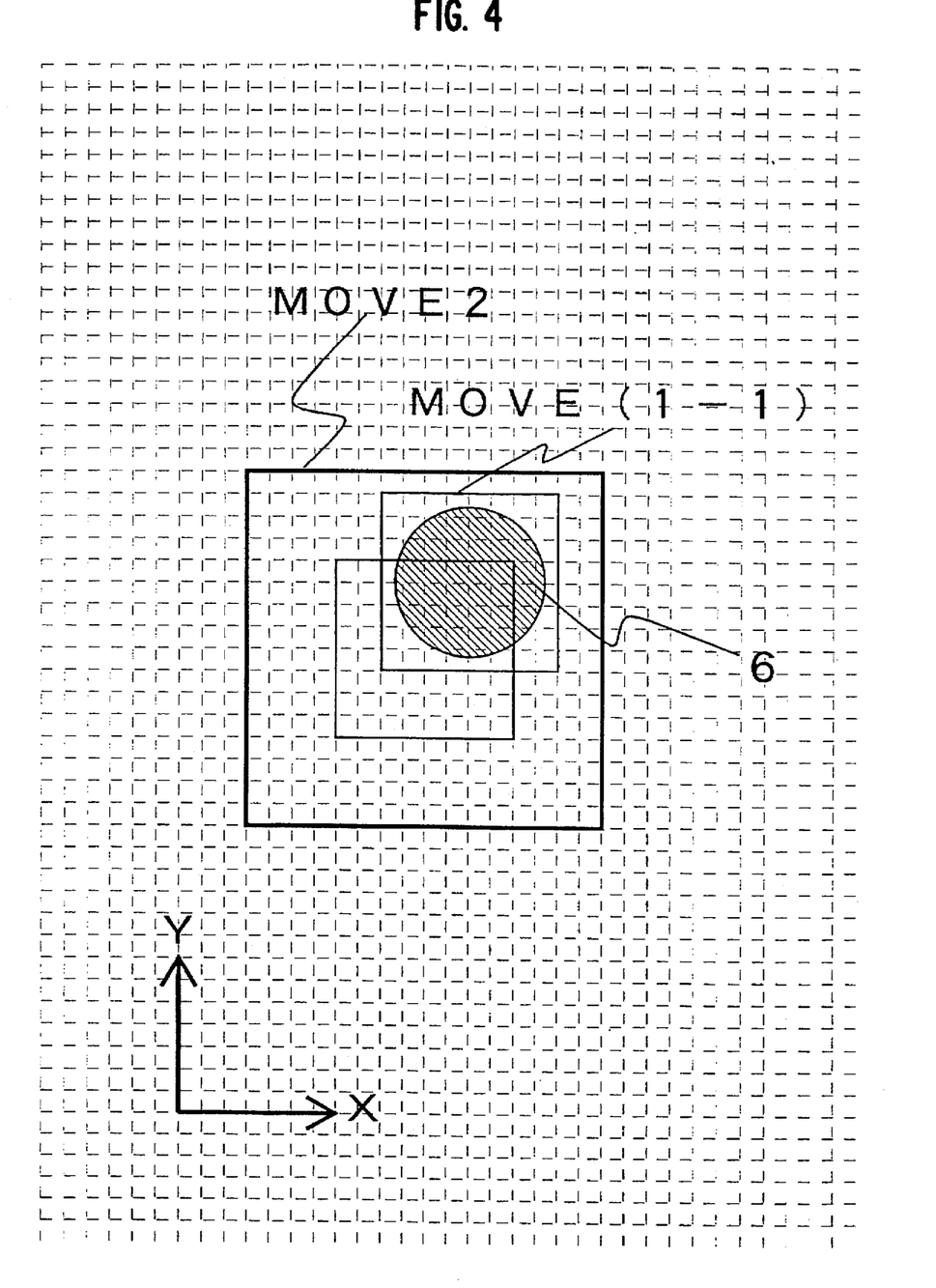
FIG. 4 is another explanatory view of the motion amount measurement process for laboratory animals according to a method in an embodiment of the present invention.

When the animal 6 moves, as shown in FIG. 4, the animal 6 after the movement is recognized as a new MOVE (1-1) mask, and the movement amount is counted. More specifically, the current position and the position between the movement are compared with each other according to the prescription which determines an interval between two neighboring optical sensors as a unit amount, and when a movement defined by X=2 and Y=3 is detected, as shown in FIG. 4, the movement amount is calculated by the following equation:

$$MOVE\ (1\text{-}1) = \sqrt{(2^2+3^2)} = 3.60555 \qquad 1$$

The result of equation 1 is rounded to obtain an amount of "3.6".

Figure 5A:
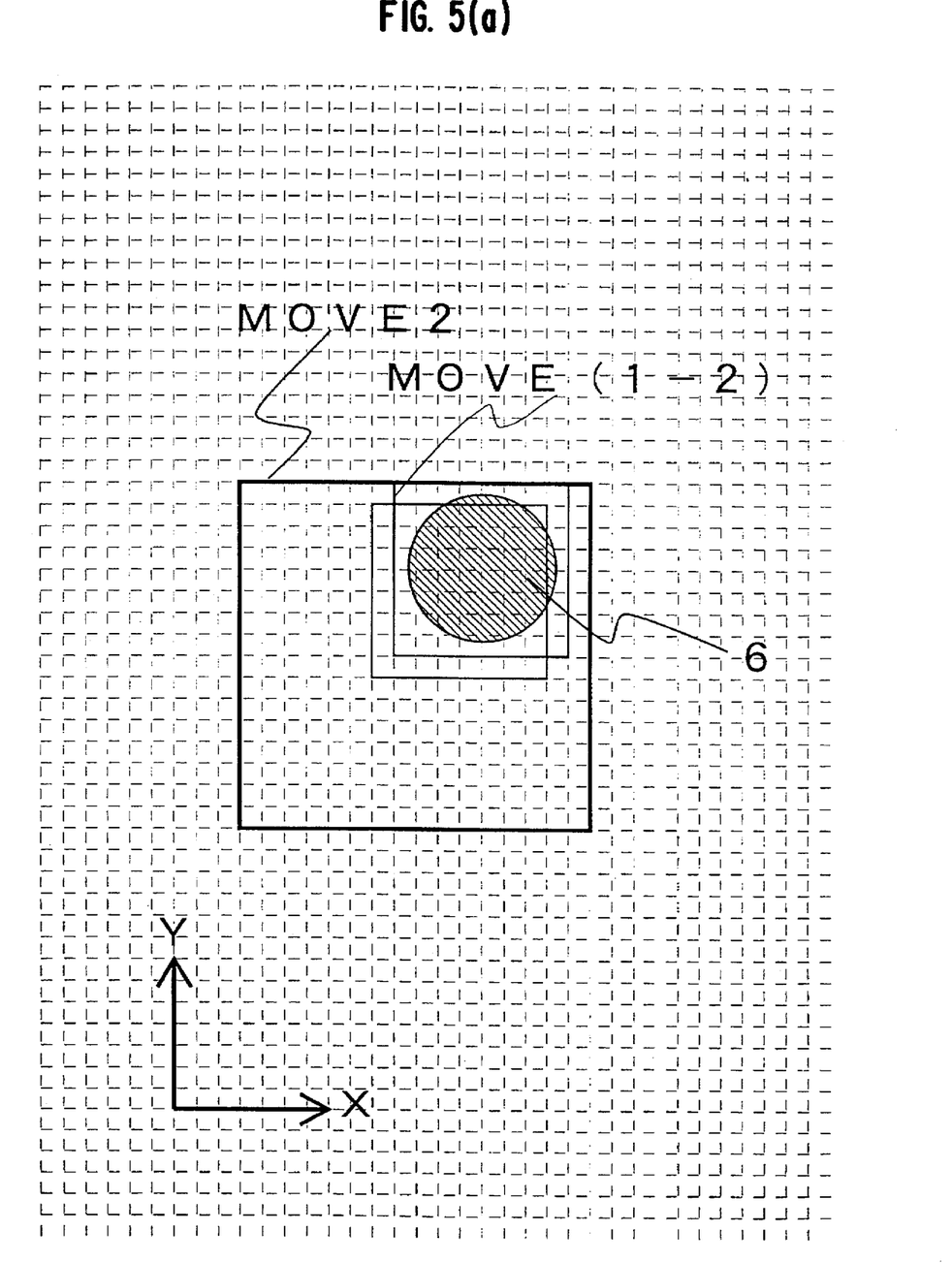
FIG. 5(a) is an explanatory view showing the state detected by sensors when a laboratory animal moves.

Thereafter, when the animal 6 further moves, as shown in FIG. 5(a), the movement amount is counted by recognizing the animal 6 after the movement as a MOVE (1-2) mask. More specifically, the current position and the position of the MOVE (1-1) mask before the movement are compared with each other, and when a movement defined by X=1 and Y=1 is detected, the movement amount is calculated by the following equation:

$$MOVE(1-2) = \sqrt{(1^2+1^2)} = 1.4142 \qquad 2$$

The result of equation 2 is rounded to obtain an amount of "1.4".

The calculation results of the MOVE (1-1) and MOVE (1-2) are added to each other, and data indicating the movement amount of the animal 6 in the state shown in FIG. 5(a) is "5.0".

Figure 6A:
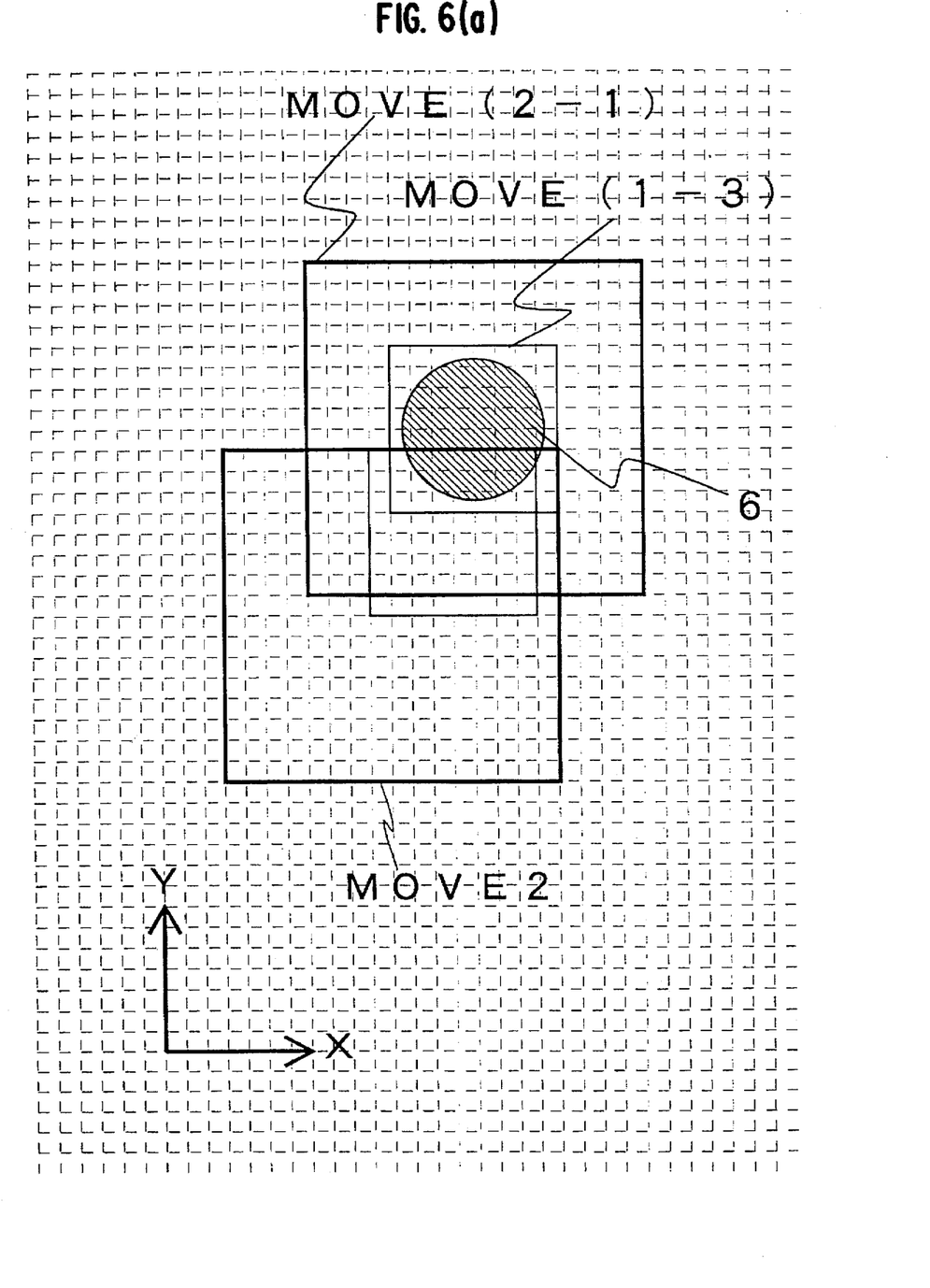
FIG. 6(a) is an explanatory view showing the state detected by sensors when a laboratory animal moves.

When the animal 6 further moves to be at a state shown in FIG. 6(a), the position of a MOVE (1-3) mask and a MOVE (2-1) mask are simultaneously counted. More specifically, the animal 6 after the movement is recognized as the MOVE (1-3) mask, and the recognized position and the position of the MOVE (1-2) mask before the movement are compared with each other. When a movement defined by X=1 and Y=5 is detected, the movement amount is calculated by the following equation:

$$MOVE(1-3) = \sqrt{(1^2+5^2)} = 5.09901 \qquad 3$$

The result of equation 3 is rounded to obtain an amount of "5.1".

The calculation results of MOVE (1-1), MOVE (1-2), and MOVE (1-3) are added to each other, and data indicating the movement amount of the animal 6 in the state shown in FIG. 6(a) is "10.1".

At the same time, when the animal 6 moves outside a range recognized as the MOVE 2 mask as shown in FIG. 6(a), the animal 6 after the movement is recognized as a new MOVE (2-1) mask, and the position of the MOVE (2-1) mask and the position of the MOVE2 mask before the movement are compared with each other. As a result, when a movement defined by X=4 and Y=9 is detected, the movement amount is calculated using the following equation:

$$MOVE(2-1) = \sqrt{(4^2+9^2)} = 9.8488 \qquad 4$$

The result of equation 4 is rounded to obtain an amount of "9.8".

As described above, the motion amount of the animal 6 is measured by detecting small movements of the animal 6 using the MOVE1 mask. On the other hand, the motion amount is measured by detecting large movements of the animal 6 using the MOVE2 mask. However, the measurement results of the MOVE1 and MOVE 2 masks almost coincide with each other.

As described above, when the animal 6 moves, as shown in FIG. 6(a), the animal 6 after the movement is recognized as a new MOVE (2-1) mask, and the movement amount is counted.

Figure 6B:
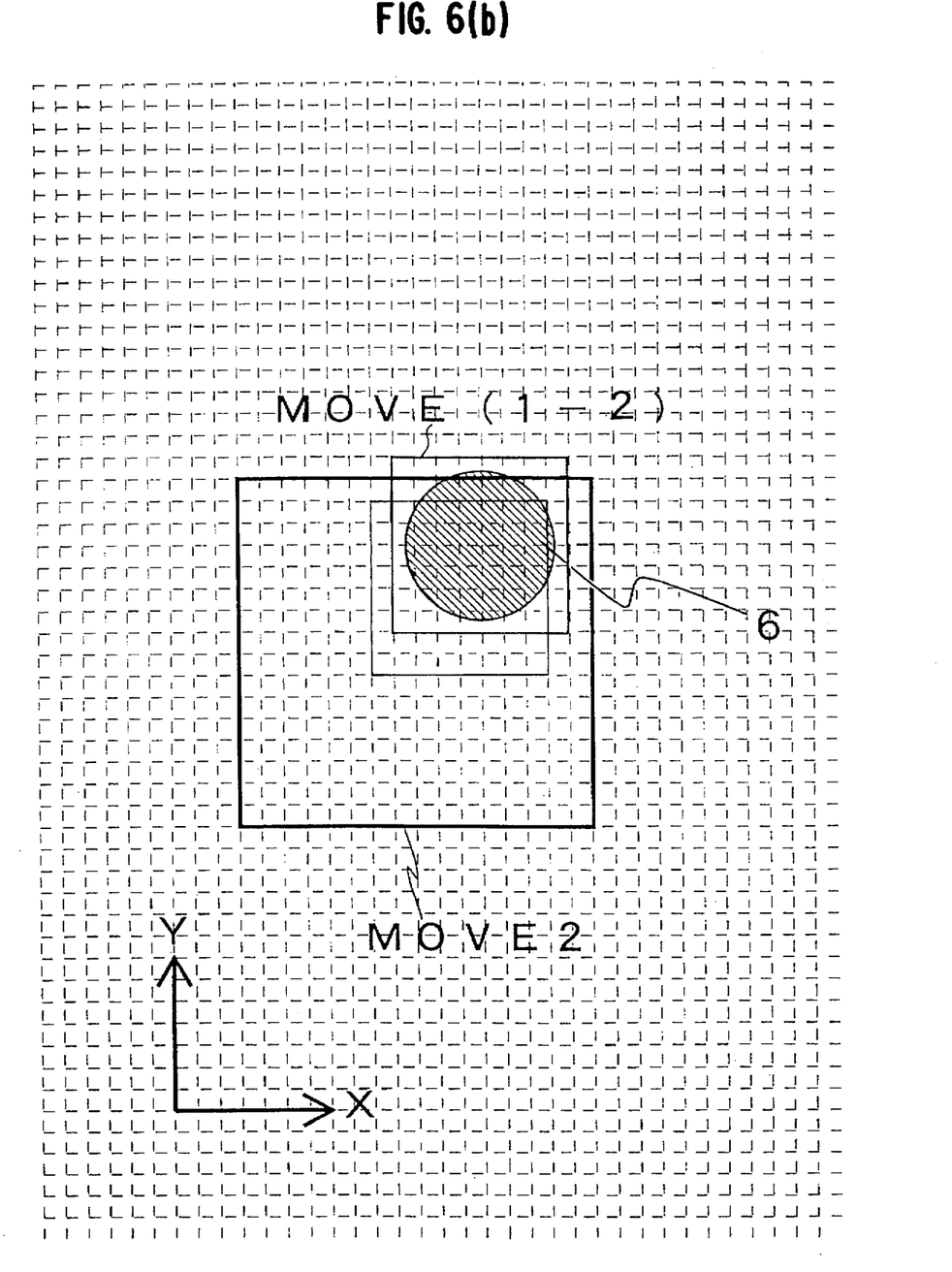
FIG. 6(b) is an explanatory view showing the state which is detected by sensors when a laboratory animal moves, but which is not recognized as a movement amount of the same.

On the other hand, the current position and the position of the MOVE2 mask before the movement are compared with each other, and when a movement defined by X<1 and Y<1 is detected, as shown in FIG. 6 (b), the animal 6 after the movement is not recognized as a new Move (2-1) mask, and the movement amount is not counted.

The above mentioned method for detecting the movements of the animal can also be applied to the MOVE1 mask. In the case of the MOVE1 mask, the current position and the position of the MOVE (1-1) mask before the movement are compared with each other, and when a movement defined by X<1 and Y<1 is detected, as shown in FIG. 5(a), another method for measuring the movement amount can be applied, in which the animal 6 after the movement is not recognized as a new MOVE (1-2) mask, as shown in FIG. 5(b), and the movement amount is not counted.

Figure 5B:
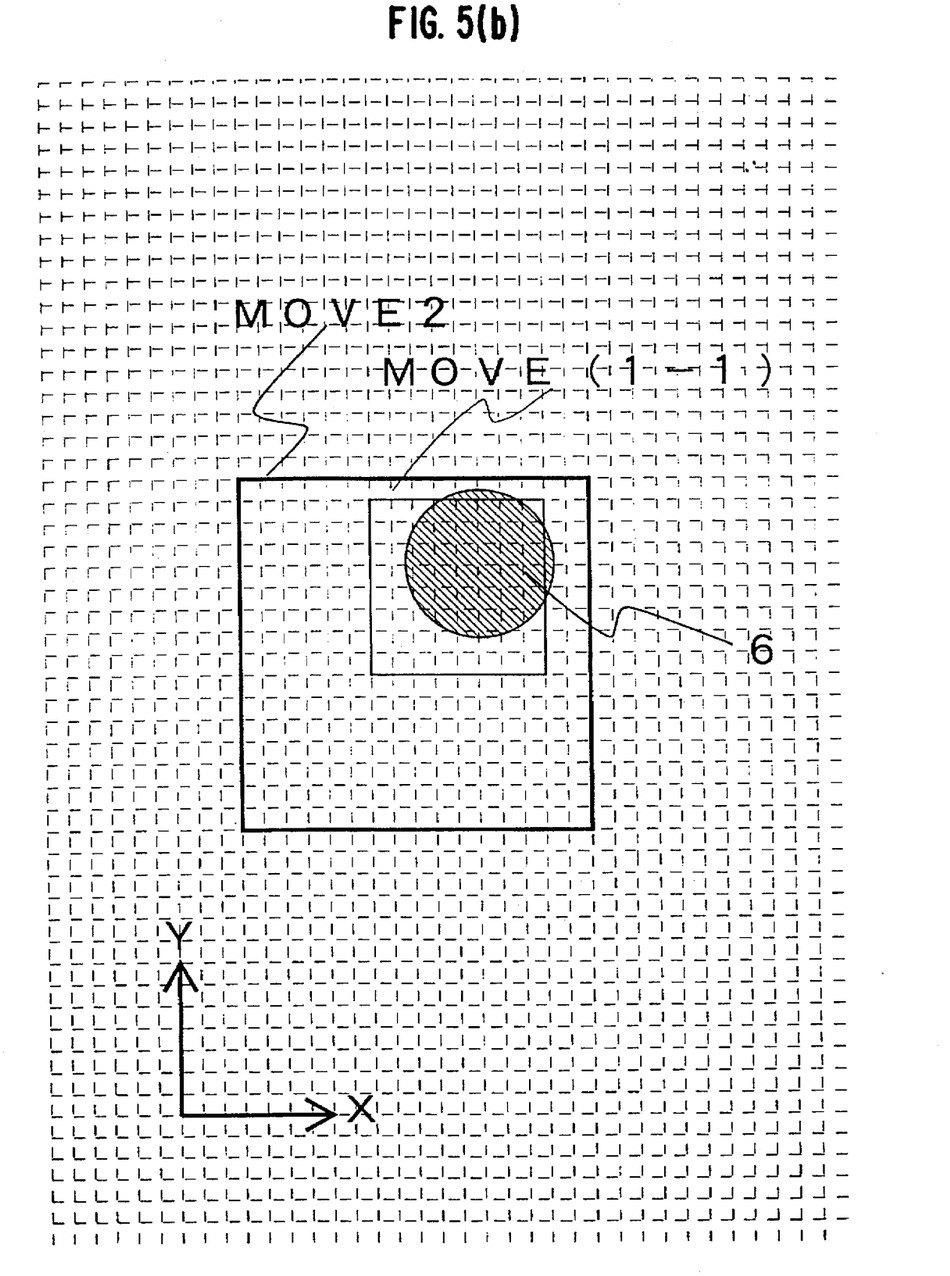
FIG. 5(b) is an explanatory view showing the state which is detected by sensors when a laboratory animal moves, but which is not recognized as a movement amount of the same.

In these cases, as shown in FIG. 5(b) and FIG. 6(b), minute actions of an animal's body such as breathing, shakes, and the like and the slight light-shielded states caused by the animal's hair can be ignored and more high-accuracy measurement can be realized.

The above mentioned, changing of the method for detecting movements of an animal can be realized very easily by changing the variable which determines the way MOVE1 and MOVE2 masks detect an animal. When an animal is small, the movement in an interval between two neighboring optical sensors as a unit amount should be measured as a movement of the animal. On the other hand, when the animal is large, the movement in an interval between two neighboring optical sensors as a unit amount should be distinguished as minute actions from the movements of the animal.

Therefore, in utilizing a method of the present invention, the masks used to detect the animal should be selected, according to the purpose of the measurement and the size of the animal.

The method for detecting movements of the animal as described above can also be applied when measuring the standing action amount of animals.

As described above, according to the present invention, by disposing the optical sensors in a staggered pattern, motion amount measurement can be performed with high accuracy as the tail of an animal is not continuously detected by the optical sensors and only the head, trunk, and legs of the animal serve as objects to be measured.

Since the optical sensor light-emitting elements are sequentially electrically scanned to emit optical beams, interferences of light among the optical sensors are prevented so that the optical sensors can be arranged at high density to achieve high-accuracy measurement. At the same time, near infrared LEDs and phototransistors can be applied because the focusing characteristics and the light-receiving sensitivity of the optical sensors become less important due to the fact that interferences of light among the optical sensors can be ignored. The use of near infrared LED's and phototransistors allows for the construction of an inexpensive apparatus.

When detecting the current position of a laboratory animal, since the laboratory animal is detected as a rectangular area, measurements using a plurality of measuring apparatuses can be easily performed and numerical data with a high degree of accuracy can be obtained.

As described above, according to the present invention, by disposing the optical sensors in a staggered pattern, motion amount measurement can be performed with high accuracy as the tail of an animal is not continuously detected by the optical sensors and only a head, trunk and legs of the animal serve as objects to be measured.

Since the optical sensor light-emitting elements are sequentially electrically scanned to emit optical beams, interferences of light among the optical sensors are prevented so that the optical sensors can be arranged at a high density to achieve a high-accuracy measurement. At the same time, near infrared LEDs and phototransistors as versatile components can be applied as the focusing characteristics and the light-receiving sensitivity of the optical sensors become less important due to the fact that interferences of light among the optical sensors can be ignored, thus providing an inexpensive apparatus.

When detecting the current position of a laboratory animal, since the laboratory animal is detected as a rectangular area, measurements using a plurality of measuring apparatuses can be easily performed and numerical data with high accuracy can be obtained.

What is claimed is:

1. A motion amount measuring method for laboratory animals comprising the steps of:
    setting a single frame to surround a laboratory animal in a bounded area,
    disposing a first plurality of optical sensor light-emitting elements in a staggered pattern on one surface of the frame, and a first plurality of optical sensor light-receiving elements in a staggered pattern on an opposing surface of the frame,
    disposing a second plurality of optical sensor light-emitting elements and a second plurality of optical sensor light-receiving elements in a staggered pattern on opposing surfaces of the frame which are respectively orthogonal to those surfaces upon which the first plurality of optical sensor light-emitting and light-receiving elements are disposed, the light-emitting elements of said first and second plurality of optical sensor light-emitting elements sequentially emitting optical beams, said emitted optical beams being received by corresponding light-receiving elements of said first and second plurality of optical sensor light-receiving elements when said emitted optical beams are not obstructed by the laboratory animal so as to detect a maximum length, a maximum width, a location, and movements of the laboratory animal, and
    adding a length corresponding to a distance between two neighboring optical sensors to the detected maximum length and the detected maximum width of the animal so as to perceive the animal as a rectangular area.

2. A method according to claim 1, wherein the animal is detected by a first area to measure motion amounts of the animal which correspond to a first type of motion, and the animal is also detected by a second area to measure motion amounts which correspond to a second type of motion, said second area being greater than said first area.

3. A motion amount measuring method for laboratory animals comprising the steps of:
    a. setting a single frame to surround a laboratory animal in a bounded area;
    b. disposing optical sensor light-emitting elements and optical sensor light-receiving elements in a staggered pattern on the surface of the frame so as to correspondingly oppose each other, said light-emitting elements emitting optical beams which are received by the corresponding light receiving elements when the optical beams are not obstructed so as to detect a maximum length, maximum width, location, and movements of the laboratory animal.
    c. adding a length corresponding to a distance between two neighboring optical sensors to the detected maximum length and the detected maximum width of the animal so as to perceive the animal as a rectangular area, and
    d. calculating a motion amount $\delta$ of the laboratory animal, detected as the rectangular area, using the following equation:

$$\delta = \sqrt{(X^2 + Y^2)}$$

where X and Y are numeric data representing the lengthwise and widthwise movements of the rectangular area on a horizontal surface.

4. A method according to claim 3 wherein said optical sensor light-emitting elements sequentially emit optical beams.

5. A motion amount measuring method for laboratory animals comprising the steps of:
    a. setting a single frame to surround a laboratory animal in a bounded area;
    b. disposing optical sensor light-emitting elements and optical sensor light-receiving elements in a staggered pattern on the surface of the frame so as to correspondingly oppose each other, said light-emitting elements emitting optical beams which are received by the corresponding light-receiving elements when the optical beams are not obstructed by an animal so as to detect a maximum length, maximum width, location, and movements of the laboratory animal;
    c. adding a length corresponding to a distance between two neighboring optical sensors to the detected maximum length and the detected maximum width of the animal so as to create a first rectangular area;
    d. generating a pre-defined second rectangular area larger than said first rectangular area, to measure motion amounts larger than those detected by said first rectangular area; and
    e. calculating a motion amount $\delta$ of the laboratory animal and detected as the first rectangular area using the following equation:

$$\delta = \sqrt{(X^2 + Y^2)}$$

where X and Y are numeric data representing the lengthwise and widthwise movements of the rectangular area on the horizontal surface.

6. A method according to claim 5, wherein said optical sensor light-emitting elements sequentially emit optical beams.

7. A motion amount measuring method for laboratory animals comprising the steps of:
    a. setting a single frame to surround a laboratory animal in a bounded area;
    b. disposing optical sensor light-emitting elements and optical sensor light-receiving elements on the surface of the frame so as to correspondingly oppose each other, said light-emitting elements emitting optical beams which are received by the corresponding light receiving elements when the optical beams are not obstructed so as to detect a maximum length, maximum width, location, and movements of the laboratory animal.
    c. adding a length corresponding to a distance between two neighboring optical sensors to the detected maximum length and the detected maximum width of the animal so as to perceive the animal as a rectangular area, and d. calculating a motion amount δ of the laboratory animal, detected as the rectangular area, using the following equation:

$$\delta = \sqrt{(X^2 + Y^2)}$$

where X and Y are numeric data representing the lengthwise and widthwise movements of the rectangular area on a horizontal surface, wherein the step of calculating a motion amount, detected lengthwise movements less than a first pre-determined number of units and detected widthwise movements less than a second predetermined number of units are not recognized as movement amounts of the laboratory animal.

8. A method according to claim 7, wherein said optical sensor light-emitting elements and said optical sensor light-receiving elements are disposed in a staggered pattern on said frame.

9. A motion amount measuring method for laboratory animals comprising the steps of:

a. setting a single frame to surround a laboratory animal in a bounded area;

b. disposing optical sensor light-emitting elements and optical sensor light-receiving elements on the surface of the frame so as to correspondingly oppose each other, said light-emitting elements emitting optical beams which are received by the corresponding light-receiving elements when the optical beams are not obstructed by an animal so as to detect a maximum length, maximum width, location, and movements of the laboratory animal;

c. adding a length corresponding to a distance between two neighboring optical sensors to the detected maximum length and the detected maximum width of the animal so as to create a first rectangular area;

d. generating a pre-defined second rectangular area larger than said first rectangular area, to measure motion amounts larger than those detected by said first rectangular area; and e. calculating a motion amount δ of the laboratory animal, detected as the first rectangular area, using the following equation:

$$\delta = \sqrt{(X^2 + Y^2)}$$

where X and Y are numeric data representing the lengthwise and widthwise movements of the rectangular area on the horizontal surface, wherein the step of calculating a motion amount, detected lengthwise movements less than a first pre-determined number of units and detected widthwise movements less than a second predetermined number of units are not recognized as movement amounts of the laboratory animal.

10. A method according to claim 9, wherein said optical sensor light-emitting elements and said optical sensor light-receiving elements are disposed in a staggered pattern on said frame.

* * * * *